Figure 1:
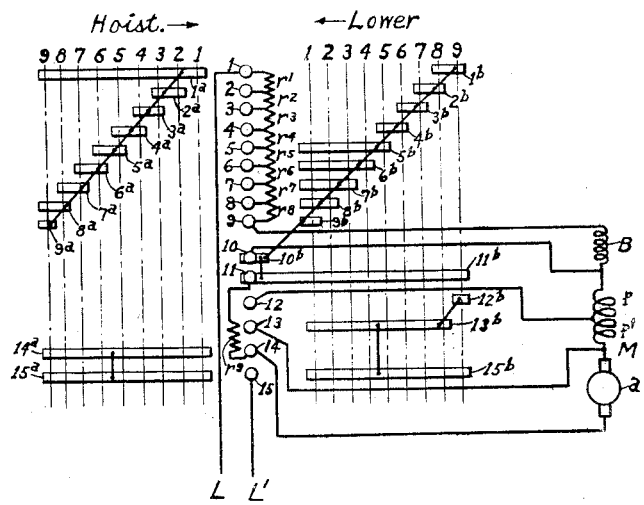

Mar. 13, 1923.

N. L. MORTENSEN

MOTOR CONTROL

Filed June 12, 1920     3 sheets-sheet 1

1,448,563

Inventor

Niels. L. Mortensen.

By Frank W Hubbard
      Attorney

Mar. 13, 1923.

N. L. MORTENSEN

MOTOR CONTROL

Filed June 12, 1920

1,448,563

3 sheets-sheet 2

Inventor
Niels. L. Mortensen.
By Franklin Hubbard
Attorney

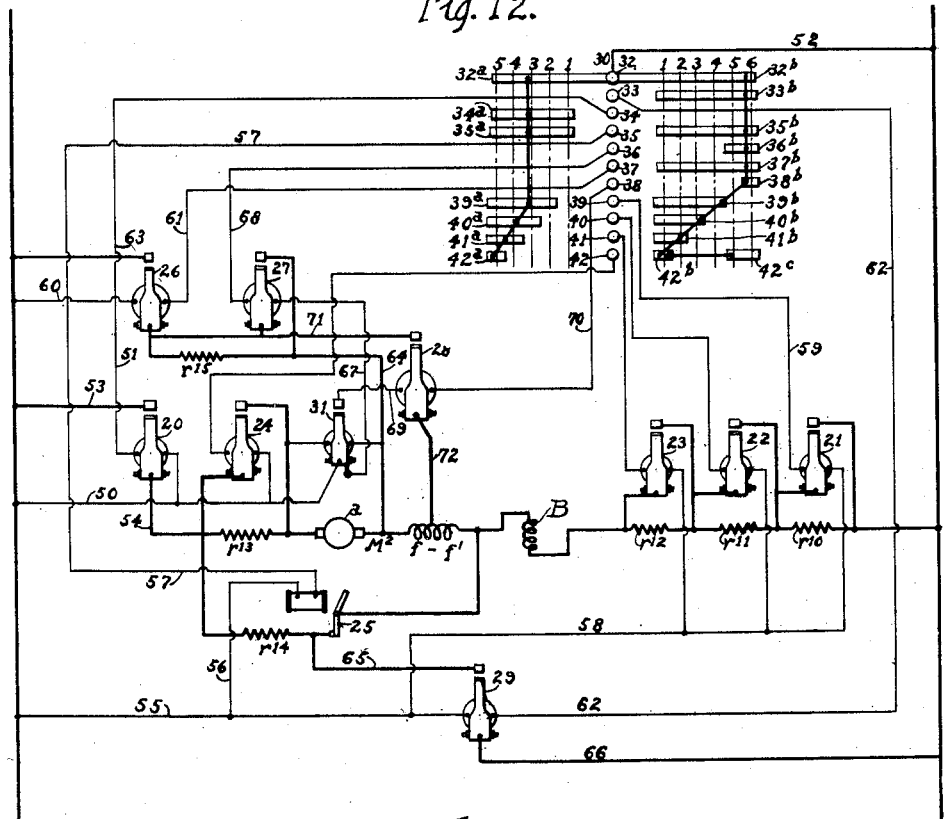

Patented Mar. 13, 1923.

1,448,563

UNITED STATES PATENT OFFICE.

NIELS L. MORTENSEN, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR CONTROL.

Application filed June 12, 1920. Serial No. 388,459.

*To all whom it may concern:*

Be it known that I, NIELS L. MORTENSEN, a citizen of the United States, residing at Milwaukee, in the county of Milwaukee and State of Wisconsin, have invented new and useful Improvements in Motor Controls, of which the following is a full, clear, concise, and exact description, reference being had to the accompanying drawing, forming a part of this specification.

This invention relates to motor control.

Where electric motors are employed for operating cranes, they are subjected to widely varying loads and for lowering of the crane hook it has been customary to establish power connections for the motor including connections permitting the motor to act as a dynamic brake. Thus when the crane hook is empty or subject to only a light load the motor operates for lowering thereof, whereas, when the hook is so heavily loaded as to overhaul the motor, the latter acts as a dynamic brake to limit the lowering speed. However, while it is obviously permissible and desirable to provide for lowering an empty hook at as high a speed as that of a heavy load, great difficulty has been experienced in providing for uniformity of lowering speed under different load conditions without unduly complicating the control means.

The present invention has among its objects to provide for attainment of a substantially uniform lowering speed with but slight modification of the present motor and control equipment.

Another object is to provide a controller which may be operated for a maximum lowering speed without danger of an excessive speed when the load is heavy.

Various other objects and advantages of the invention will hereinafter appear.

According to the present invention it is proposed to employ an electric motor having a plurality of field windings which may be connected to act either cumulatively or differentially and to provide control means therefor which will enable the field windings to so act during lowering according to load conditions. The motor may be either of the series type or the compound type. When of the former type, its field winding is divided into a plurality of sections controllable to act either cumulatively or differentially and when of the compound type its series and shunt field windings are controlled to obtain either cumulative or differential action thereof.

The accompanying drawings illustrate certain embodiments of the invention and the same will now be described, it being understood that such embodiments are susceptible of various modifications without departing from the scope of the appended claims.

In the drawing,

Fig. 1 diagrammatically illustrates a series motor and drum controller therefor.

Figure 6:
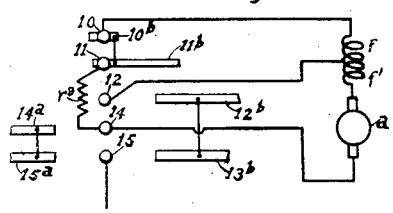
Figure 7:
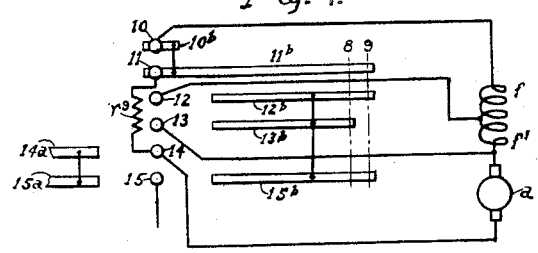
Figure 8:
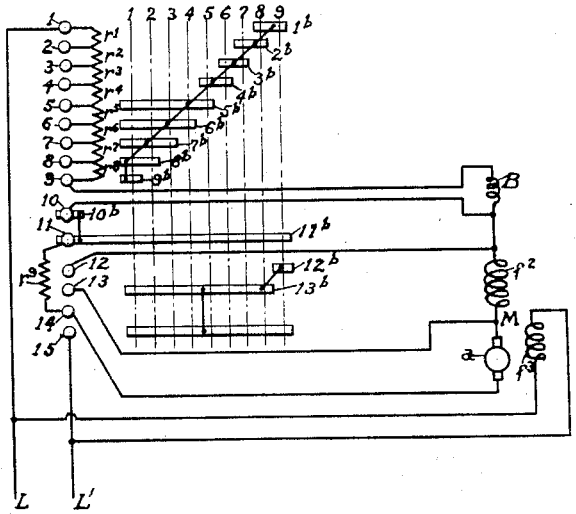
Figure 9:
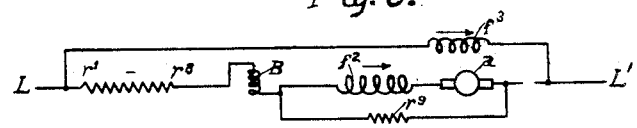
Figure 10:
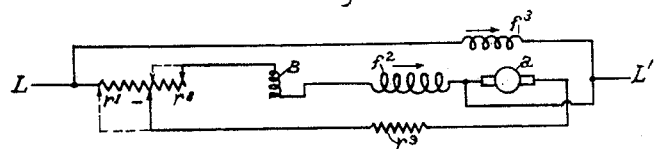
Figure 11:
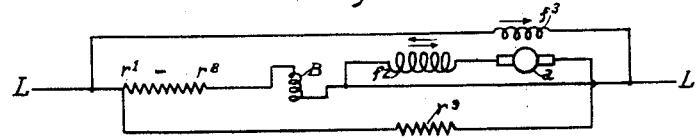

Figs. 2, 3, 4 and 5 diagrammatically illustrate different sets of circuit connections established by said drum controller;

Figs. 6 and 7 diagrammatically illustrate modifications of said drum controller;

Fig. 8 diagrammatically illustrates a compound motor and drum controller therefor;

Figs. 9, 10 and 11 diagrammatically illustrate different sets of circuit connections established by the drum controller shown in Fig. 8;

Fig. 12 diagrammatically illustrates a series motor and an electro-magnetic controller therefor; and, Figs. 13, 14, 15 and 16 diagrammatically illustrate different sets of circuit connections established by the controller shown in Fig. 12.

Referring to Fig. 1, the same illustrates a series motor M having an armature $a$ and series field windings $f$ and $f^1$, which might comprise sections of a single winding. The series field windings are provided with commutatable connections to cause the same to act either cumulatively or differentially and as will be understood, said windings should be proportioned to best function as hereinafter described. Fig. 1 also shows diagrammatically a brake coil $b$ to control a mechanical brake for the motor M, said coil being adapted for series connection with the motor in the customary manner.

The drum shown in Fig. 1 for control of the motor M and brake coil B is with certain additions identical with the drum disclosed in my prior Patent No. 1,227,177, granted May 22, 1917. It comprises a series of contacts 1 to 15 and two sets of co-operating segments, one set including segments $1^a$ to $9^a$, $14^a$ and $15^a$ and the other including segments $1^b$ to $13^b$ and $15^b$. The segments of the former set co-operate with the contacts for hoisting, while the segments of the latter set co-operate with said contacts for lowering.

Figure 2:
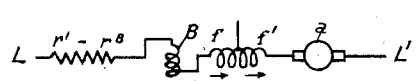

Contacts 1 to 9 of the drum have connected thereto resistances $r^1$ to $r^8$ and the hoist segments co-operate with the contacts as fully set forth in my prior patent aforesaid, to connect the motor, brake coil B and the resistance $r^1$ to $r^8$ in series across supply lines L, $L^1$ as shown in Fig. 2. The field windings are connected in series for cumulative action thereof. The drum is thereafter operable to successively exclude the resistance $r^1$ to $r^8$ in the order stated.

Figure 3:
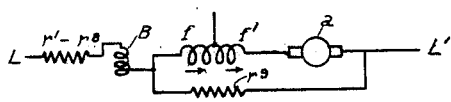

Also the drum is provided with a resistance $r^9$ connected between contacts 11 and 14 and in "off" position of the drum the segments $10^b$ and $11^b$ co-operate with contacts 10 and 11 to connect said resistance and the motor in a closed loop as exemplified in Fig. 3, and as also disclosed in my prior patent aforesaid. Such connections provide for dynamic braking action of the motor when overhauled by its load, and the field windings are so connected as to act cumulatively, current flowing through both in the same direction.

Figure 4:
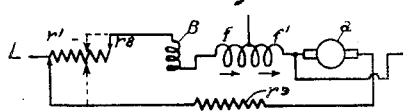

The lowering segments of the drum co-operate with the contacts as fully described in my prior patent aforesaid, to establish the motor connections shown in Fig. 4. Referring to this figure, the armature and series field are connected in parallel, the direction of flow of current through the armature being reversed and the resistances $r^1$ to $r^4$ being initially included in series with both branches of the motor circuit, and the resistances $r^5$ to $r^8$ being initially short-circuited as shown by dotted lines. Thereafter the drum is operable to successively include the resistances $r^8$, $r^7$, $r^6$ and $r^5$ in the field branch of the motor circuit and further operable to successively exclude the resistances $r^4$, $r^3$, $r^2$ and $r^1$ from the armature branch of the motor circuit. Throughout such movement of the drum the connections of the field windings are such that current flows through both windings in the same direction for cumulative action thereof and a consequent high torque of the motor.

Figure 5:
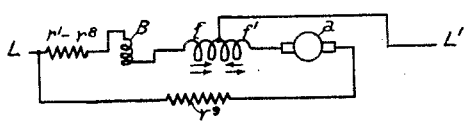

When the drum is moved to its 9th lowering position, segment $13^b$ disengages contact 13 to interrupt the connection between line $L^1$ and the motor, while segment $12^b$ engages contact 12 to establish a connection between line $L^1$ and the motor field windings at a point therebetween, thus establishing the circuit connections shown in Fig. 5. Referring to this figure, it will be observed that the motor armature and field winding $f^1$ are connected in series across the line through resistance $r^9$, while the field winding $f$ is connected across the line in series with the brake coil B and resistances $r^1$ to $r^8$, current thus passing through the field windings in opposite directions.

It will thus be apparent that with an empty hook or light load, the motor field windings will act differentially thereby weakening the motor field for a higher lowering speed. On the other hand, if the connections shown in Fig. 5 are established under heavy load conditions, overhauling of the load will cause the motor to act as a generator, sending current through both field windings in the same direction, thus causing said windings to act cumulatively for effective dynamic braking. Accordingly by properly proportioning the field windings, a substantially uniform maximum lowering speed may be obtained regardless of variations in load or if preferred a higher lowering speed may be obtained for light loads.

While the drum described provides for establishment of the connections shown in Fig. 5 only when the drum is moved to its final lowering position, it is to be understood that the drum might be modified to establish said connections in any desired position thereof. For example, as shown in Fig. 6, the drum might be modified by omission of contact 13 and segment $13^b$ and elongation of segment $12^b$, to establish the connection between the line and the point between the motor field windings in the first lowering position and to maintain such connection during operation of the drum to vary the resistances $r^1$ to $r^8$.

Also it is to be understood that one of the series field windings might be short-circuited in any of the various positions of the drum. For example, as shown in Fig. 7, the drum might be modified by elongation of the segment $12^b$ to provide for short-circuiting of the field winding $f$ in all but the 9th lowering position of the drum.

Referring to Fig. 8, the same diagrammatically illustrates a compound wound motor $M^1$ having an armature $a$, series field winding $f^2$ and shunt field winding $f^3$. The series field winding $f^2$ has commutatable connections whereby it may be caused to act either cumulatively with or in opposition to the shunt field winding. This figure also shows a brake coil B similar to that shown in Fig. 1.

The drum shown in Fig. 8 for controlling the compound motor is in all respects similar to that shown in Fig. 1 but the hoisting segments have been omitted. Likewise, the drum is provided with resistances similar to those shown in Fig. 1 and accordingly, the drum parts and resistances have been given the same reference characters as in Fig. 1. In "off" position of the drum, the segments $10^b$ and $11^b$ engage contacts 10 and 11 to establish the circuit connections shown in Fig. 9. Referring to this figure, it will be seen that the motor armature and series field are disconnected from line $L^1$ and connected in a closed loop including the resistance $r^9$, while the shunt field is connected across lines L and $L^1$. Thus if the motor is overhauled by its load, it will act as dynamic brake, current flowing through the field windings to effect cumulative action thereof.

Movement of the drum to its first lowering position establishes the circuit connections shown in Fig. 10 which provide for connection of the motor armature and series field winding across the line in the same manner as in Fig. 4, the connections being such that the flow of current through series field winding is in the same direction as during hoisting, whereby said winding acts cumulatvely with the shunt field winding. Further operation of the drum through its positions 2 to 8 effects control of the resistances $r^1$ to $r^8$ in the manner already described, the direction of flow of current through the series field winding remaining unchanged.

When, however, the drum is moved to its 9th position, segment $13^b$ disengages contact 13 to interrupt the connection from line $L^1$ to the motor armature and series field while segment $12^b$ engages contact 12 to connect line $L^1$ to the terminal of the series field remote from the armature, thereby commutating the connections as shown in Fig. 11. Referring to this figure, it will be observed that the motor armature and series field are connected in series across the line through resistance $r^9$ and in parallel to the resistances $r^1$ to $r^8$ and the brake coil B. Also, it will be observed that the connections are such as to cause the current supplied from the line to flow through the series field winding in a reverse direction to that previously described, causing said winding to oppose the shunt field winding and thus weaken the motor field for an increased speed. On the other hand, the connections are such that should the load overhaul the motor, the latter would act as a dynamic brake sending current through the series field winding $f^2$ in a direction to act cumulatively with the shunt field winding for effective dynamic braking.

Referring to Fig. 12, the same shows a series motor $M^2$ having an armature $a$ and series field windings $f$ and $f^1$ as in Fig. 1. Also, this figure shows a brake coil B similar to that shown in Fig. 1.

The controller shown in Fig. 12 comprises resistances $r^{10}$ to $r^{13}$ for series connection with the motor, a resistance $r^{14}$ for connection in parallel to the motor and an additional resistance $r^{15}$ for purposes hereinafter set forth. The controller also includes an electro-magnetic main switch 20 controlling the continuity of the motor circuit, electromagnetic switches 21 to 24 for controlling the resistances $r^{10}$ to $r^{13}$, a normally closed electro-magnetic switch 25 controlling the circuit of resistance $r^{14}$ and electro-magnetic switches 26 to 29 for controlling lowering connections. Further, the controller includes a drum 30 to control all the aforesaid electro-magnetic switches and an electro-responsive relay 31 to co-operate with the drum to control certain of said switches, said relay having its winding connected across the motor armature. The drum 30 comprises a set of contacts 32 to 42, a set of hoisting segments $32^a$, $34^a$, $35^a$, $39^a$ to $42^a$ and a set of lowering segments $32^b$, $33^b$ and $35^b$ to $42^b$ together with an additional lowering segment $42^c$.

The circuit connections are such that the drum in its first hoisting position completes circuit from line L by conductor 50 through the winding of main switch 20 by conductor 51 to drum contact 34 and thence through segments $34^a$ and $32^a$ to contact 32 by conductor 52 to line $L^1$. Switch 20 thereupon responds to complete circuit from line $L^1$ by conductor 53 through said switch by conductor 54 through the resistance $r^{13}$, motor armature, series field winding, brake coil and resistance $r^{12}$ to $r^{10}$ all in series, to line $L^1$, thereby establishing the starting connections shown in Fig. 13. Also, the drum, in its first position completes circuit from line $L^1$ by conductors 55 and 56 through the winding of switch 25 by conductor 57 to contact 35 and thence through said drum to line $L^1$, thus effecting energization of said switch and interrupting the circuit of resistance $r^{14}$. Movement of the drum to its second hoisting position completes circuit from line L by conductors 55 and 58 through the winding of switch 21 by conductor 59 to drum contact 39 and segment $39^a$ and thence through said drum to line $L^1$. Switch 21 thereupon responds to short-circuit the resistance $r^{10}$ and movement of the drum to its 3rd, 4th and 5th positions progressively establishes parallel circuits to energize switches 22, 23 and 24 for short-circuiting the resistances $r^{11}$, $r^{12}$ and $r^{13}$ progressively as shown in dotted lines, Fig. 13.

When the drum is returned to "off" position it interrupts the energizing circuit of switch 25 causing said switch to close for establishment of dynamic braking connections as shown in Fig. 14. Referring to this figure, the motor armature and series field windings are connected in a closed loop including a resistance $r^{13}$ and $r^{14}$.

The drum 30 in its first lowering position completes circuit from line L by conductor 60 through the winding of switch 26 by conductor 61 to drum contact 37 and segment $37^b$ and thence through said drum to line $L^1$, thereby energizing switch 26. Also, the drum establishes circuit from line L by conductor 55 through the operating winding of switch 29 by conductor 62 to drum contact 33 and segment $33^b$ and thence through said drum to line L¹, thus also energizing switch 29. Moreover, the drum re-establishes the energizing circuits of switches 21 to 25 and thus closure of switches 26 and 29 establishes the motor connections shown in full lines Fig. 15. More particularly, closure of switch 26 completes circuit from line L by conductor 63 through said switch and resistance $r^{15}$ by conductor 64 to the motor at a point between the armature and series field windings thereof. From this point, circuit extends through the series field windings and brake coil to line L¹ and from said point through the motor armature and resistance $r^{14}$ by conductor 65 through switch 29 by conductor 66 to line L¹. The motor is thus supplied with current for reverse operation thereof by reversal of the flow of current through its armature, its field windings acting cumulatively.

The drum when moved to its second, third and fourth lowering positions, successively interrupts the energizing circuits of switches 21 to 24 for progressively including the resistances $r^{10}$ to $r^{12}$ in the field branch of the motor circuit and the resistance $r^{13}$ in the armature branch of the motor circuit as shown in dotted lines, Fig. 15. On the other hand, when the drum is moved to its fifth position its segment $42^c$ engages contact 42 for re-energization of switch 24 while its contactor segment $36^b$ engages contact 36 to establish circuit from line L by conductor 50 through down contacts of relay 31 by conductor 67 through winding of switch 27 by conductor 68 to and through said drum to line L¹. Switches 24 and 27 are thus energized to respectively shortcircuit the resistances $r^{13}$ and $r^{15}$, the short circuit of the latter being shown in dotted lines Fig. 15.

The drum in its sixth position completes a circuit from relay 31 by conductor 69 through the winding of switch 28 by conductor 70 to drum 69 through the winding of switch 28 by conductor 70 to drum contact 38 and segment $38^b$ and thence through said drum to line L¹ whereby upon response of relay 31, which has a direct connection to line L, switch 28 is energized. The switch 28 in responding completes circuit from L by conductor 63 through switch 26 by conductor 71 through said switch 28 by conductor 72 to the motor field windings at a point therebetween, whereby the motor circuit is commutated as shown in Fig. 16. Also when the relay 31 responds to effect energization of the switch 28 it disengages its down contacts to de-energize switch 27 for re-insertion of resistance $r^{15}$ in circuit. Referring to Fig. 16, it will be observed that if the resistance $r^{15}$ is properly designed current will flow in opposite directions through the sections of the field winding causing the same to act in opposition to weaken the motor field. Moreover, it will be apparent from Fig. 12 that the relay 31 prevents establishment of connections shown in Fig. 16 until the motor has acquired a definite speed determined by the adjustment of said relay, thus insuring maintenance of the connections for higher torque until the motor acquires such predetermined speed. This is very advantageous in that it insures against premature curtailment of torque by careless operation of the drum.

What I claim as new and desire to secure by Letters Patent is:

1. The combination, with an electric motor having a plurality of field windings including a series field winding, of control means to establish power connections for reverse operations of said motor and to establish in conjunction with certain of said power connections a dynamic braking circuit for the motor including a series field winding so connected as to be subjected to reversals of polarity under different load conditions, the polarity of another series field winding remaining the same.

2. The combination, with an electric motor having a plurality of field windings including a series field winding, of control means to establish power connections for said motor including a circuit which permits said motor to act as a dynamic brake, said means being operable to connect a series field winding of said motor in the dynamic braking circuit to either insure action thereof cumulatively with other of said field windings or to render it subject to reversal of polarity under varying load conditions for action of said field windings either cumulatively or differentially according to load conditions.

3. The combination, with an electric motor having a plurality of field windings including a series field winding, of control means to establish power connections for reverse operations of said motor and for constant polarity of certain of said field windings, including a series winding and to establish in conjunction with certain of said power connections a circuit which permits said motor to act as a dynamic brake, said means including means to connect a series field winding of said motor in the dynamic braking circuit to render its polarity either independent of or subject to reversal by the dynamic braking current.

4. The combination with an electric motor having a plurality of field windings, of control means to establish a closed loop including the motor armature and certain of said field windings with line connections placing the same in a parallel relation, said means also providing for variation of the line connections of said loop to place the armature and the latter field winding in series for action of said latter field winding either comulatively with or in opposition to other of said field windings.

5. The combination with a series motor having a plurality of field windings, of control means to establish a closed loop including the motor armature and said windings and to establish line connections for said loop placing the armature and field windings in a parallel relation for cumulative action of said windings, said means also providing for variation of the line connections of said loop to place the motor armature and certain of said windings in a series relation for action of said windings either cumulatively or differentially according to load conditions.

6. The combination with a series motor having a plurality of field windings, of means to establish power connections for said motor with its armature and field windings connected in series and other power connections for said motor with its armature and field windings connected in a closed loop having a line connection between the armature and field windings for reverse operation, said control means including means to shift the line connection to a point between said field windings.

7. The combination, with an electric motor having a plurality of field windings, of a controller to establish a closed loop including the motor armature and certain of said windings with line connections dividing said loop into parallel armature and field branches, said field windings under such conditions acting cumulatively, said controller including means controlling the parallel branches of such loop for regulation of said motor and further including means to vary the line connections of said loop to subject certain of said windings to reversals of polarity under different load conditions.

8. The combination, with an electric motor having a plurality of field windings, of a controller to establish a closed loop for the motor armature and certain of its field windings with line connections placing the motor armature and the latter of said field windings either in a parallel or series relation with respect to the line, said controller insuring establishment of such parallel connections prior to establishment of such series connections.

9. The combination, with an electric motor having a plurality of field windings, of a controller to establish a closed loop for the motor armature and certain of its field windings with line connections placing the motor armature and the latter of said field windings either in a parallel or series relation with respect to the line, said controller insuring establishment of such parallel connections prior to establishment of such series connections, and including means insuring against establishment of such series connections under abormal electrical conditions.

In witness whereof, I have hereunto subscribed my name.

NIELS L. MORTENSEN.